SEMICONDUCTOR MULTIPLE-WORD CORRELATOR

Filed July 31, 1962 3 Sheets-Sheet 1

Inventor:
Michael E. Mitchell,
by D. ? Ready
His Agent.

Feb. 22, 1966 M. E. MITCHELL 3,237,160

SEMICONDUCTOR MULTIPLE-WORD CORRELATOR

Filed July 31, 1962 3 Sheets-Sheet 2

Inventor:
Michael E. Mitchell,
by D. T. Ready
His Agent.

Feb. 22, 1966 M. E. MITCHELL 3,237,160

SEMICONDUCTOR MULTIPLE-WORD CORRELATOR

Filed July 31, 1962 3 Sheets-Sheet 3

Inventor:
Michael E. Mitchell,
by D. T. Healy
His Agent.

United States Patent Office 3,237,160

Patented Feb. 22, 1966

3,237,160
SEMICONDUCTOR MULTIPLE-WORD CORRELATOR

Michael E. Mitchell, Ithaca, N.Y., assignor to General Electric Company, a corporation of New York Filed July 31, 1962, Ser. No. 213,641
5 Claims. (Cl. 340—146.1)

The invention is directed to correlation apparatus for simultaneously correlating a received waveform against many reference waveforms. The apparatus is particularly suitable for applications where a combination of binary data signals is transformed into a special code word form for data transmission, and upon reception of the transmitted code word, it is transformed back to the original form of the data signals in such a manner that the correct original data is made available in spite of errors and noise introduced between transmission and reception. The invention in some forms is directed to simplified correlation equipment for decoding codes such as the code class known as the "augmented maximum sequence" codes. However, the invention is also applicable to various other digital signal processing requirements including radar pulse compression techniques.

Considering error correction code applications, an example of a suitable augmented maximum sequence code is the (7,4) code wherein the data word consists of a sequence of any four binary bits which is encoded into a seven bit code by special rules. These rules result in 16 possible combinations of the seven bits and these combinations constitute the vocabulary of the code. The rules for generating the vocabulary are selected so that each vocabulary word is sufficiently distinctive to permit its original identity to be determined even if errors and noise are introduced.

There are several approaches to the realization of error correction apparatus. The different approaches to decoding apparatus tend to have individual advantages and disadvantages. For example, there is a class of decoders which is characterized by the initial step of quantizing the signals of the received code word. That is, each received bit signal position is assigned a value of "1" or "0" and the decoding apparatus operates as if the received bit signal was either a perfect "1" or "0" signal. The remaining decoder apparatus then performs digital logic operations to relate the received code word to the code word vocabulary. This approach permits the use of mostly digital computer components and gains their advantages such as standardization of parts, design flexibility, etc. However, it is well known that quantizing the received bit signals removes substantial information content. Therefore, techniques which correlate received code words with the code vocabulary have a clear advantage in their error correction capability because the information loss in quantizing is eliminated. But correlation as a means of error correction faces two important difficulties. A correlation decoder requires a memory mechanism for enabling a correlation comparison of the received code word signal sequence with all the words of the code vocabulary and requires analog correlation components for obtaining the correlation of all the code words with the received code word signal sequence. These requirements have resulted in complex systems such as those based on multitapped delay lines. These delay lines are necessarily handicapped by having signal processing rates which cannot be adjusted; and delay lines having many taps which accurately re-deliver the delayed signal are difficult to fabricate.

Also, although binary decoding of error-correcting codes frequently offers a worthwhile improvement in the performance of data transmission systems, the important case of Gaussian noise at low signal-to-noise ratio is one in which binary decoding is not easily justified. In such cases, multiple-word correlation, which is the optimum signal recovery technique, is often the only available means for extracting a useful amount of information from the received noisy signal. A formidable obstacle to the general use of word correlation for efficient signal recovery has been the extreme complexity required for its realization.

Accordingly, it is an object of the invention to provide simplified correlation equipment for digital signal processing which does not require delay lines.

It is a further object of the invention to provide a simplified correlation error correction decoder which is operable at variable digital data rates.

Briefly stated, in accordance with one embodiment of the invention, a simplified correlation error correction decoder for an augmented maximum length code is provided. A shift register is adapted through feedback connections to cyclically generate a set of binary signal sequences representing the code words. Because of the cyclic nature of this code, all of the code words can be made available in parallel in the process of generating a single code word. Each of these binary signal sequences (representing a code word) is respectively applied to one of a set of multiplier-integrator circuits which are also connected to the source of sequential signals which supplies the received code word to be decoded. The outputs of the multiplier-integrator circuits are applied to a maximum likelihood detector to determine the maximum correlation.

These and other objects and features of the present invention will become apparent from the accompanying detailed description and drawings in which.

Figure 1:
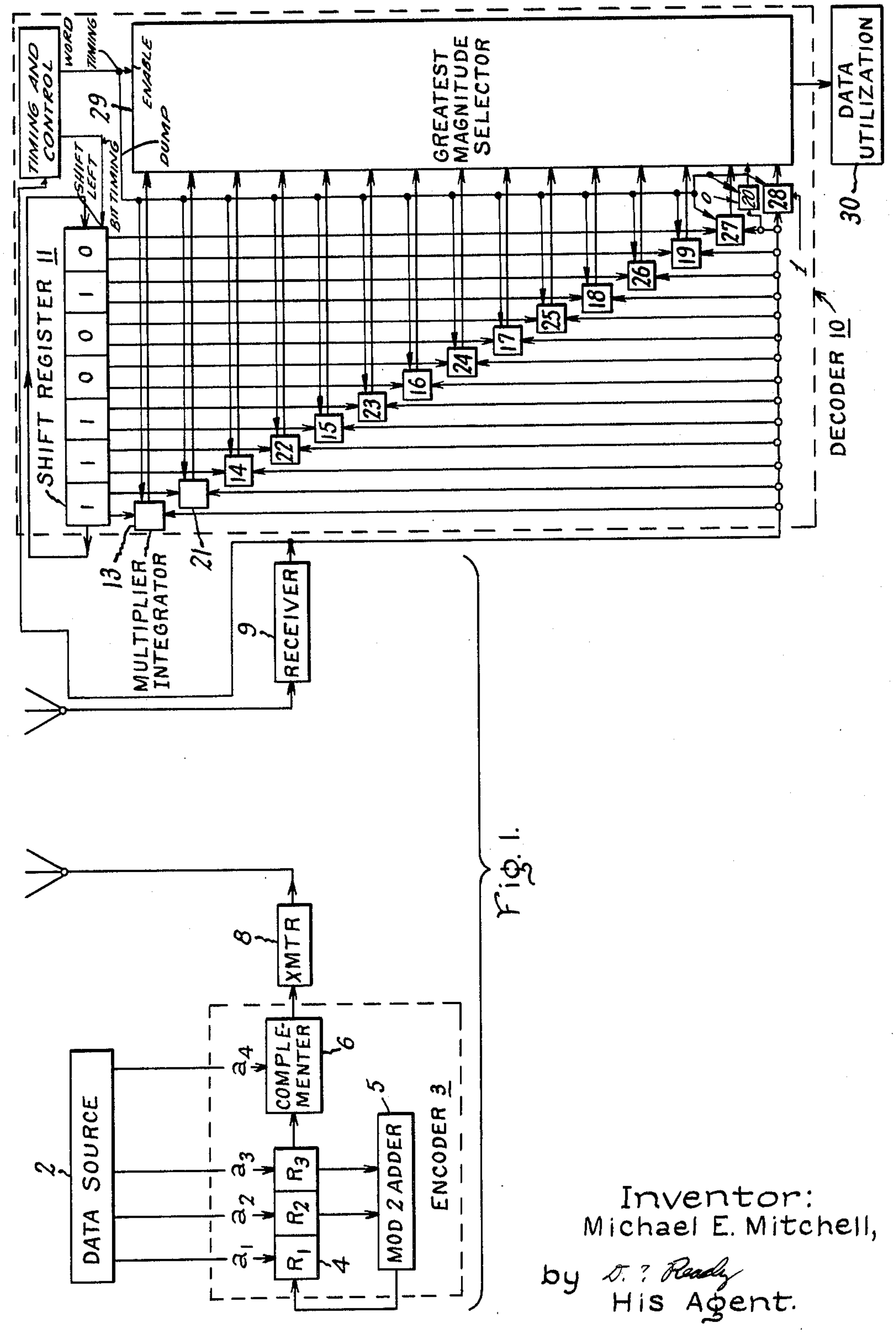
FIGURE 1 is a block diagram of a first embodiment of the invention for a (7,4) error correction code application.

FIGURE 1 is a block diagram of a decoder which together with the illustrated encoder and the data transmission apparatus provides a representative data transmission system. The encoder 3 accepts data in parallel form from a source of digital data 2. A data word from the data source 2 consists of four binary bit signals $a_1$, $a_2$, $a_3$, $a_4$ which can assume 16 possible combinations. The encoder, by conventional means, transforms the four bit digit word to a seven bit code word which has three redundant bits added to the original four bits. This is accomplished with a shift register 4 having feedback from its second and third stages applied to its first stage in accordance with the output of the modulo 2 adder 5 in the feedback path. The output of the shift register 4 is a sequence of bit signals which would cyclically repeat itself if more than seven bits were generated. The first three bits of the sequence are the original three bits $a_1$, $a_2$, $a_3$ of the data word which were introduced into the shift register. The following four bits are those which are sequentially generated by the modulo 2 adder 5. The result is a "maximum length" code (7,3). This sequence is "augmented" by operation of a complementer 6 which is conveniently a modulo 2 adder that converts each bit from the shift register to its complement when the fourth bit signal $a_4$ of the input data word is a "1." When the fourth bit $a_4$ is a "0," the output of shift register 4 is unchanged by complementer 6. The resulting relationship between the input data word $a_1$, $a_2$, $a_3$, $a_4$ and the output sequence $a_1'$, $a_2'$, . . . $a_7'$ can be tabulated in a truth table as follows:

*(7,4) Code Vocabulary*

| Data Word | | | | Code Word | | | | | | |
|---|---|---|---|---|---|---|---|---|---|---|
| $a_1$ | $a_2$ | $a_3$ | $a_4$ | $a_1'$ | $a_2'$ | $a_3'$ | $a_4'$ | $a_5'$ | $a_6'$ | $a_7'$ |
| 1 | 1 | 1 | 0 | 1 | 1 | 1 | 0 | 0 | 1 | 0 |
| 1 | 1 | 0 | 0 | 1 | 1 | 0 | 0 | 1 | 0 | 1 |
| 1 | 0 | 0 | 0 | 1 | 0 | 0 | 1 | 0 | 1 | 1 |
| 0 | 0 | 1 | 0 | 0 | 0 | 1 | 0 | 1 | 1 | 1 |
| 0 | 1 | 0 | 0 | 0 | 1 | 0 | 1 | 1 | 1 | 0 |
| 1 | 0 | 1 | 0 | 1 | 0 | 1 | 1 | 1 | 0 | 0 |
| 0 | 1 | 1 | 0 | 0 | 1 | 1 | 1 | 0 | 0 | 1 |
| 0 | 0 | 0 | 0 | 0 | 0 | 0 | 0 | 0 | 0 | 0 |
| 1 | 1 | 1 | 1 | 0 | 0 | 0 | 1 | 1 | 0 | 1 |
| 1 | 1 | 0 | 1 | 0 | 0 | 1 | 1 | 0 | 1 | 0 |
| 1 | 0 | 0 | 1 | 0 | 1 | 1 | 0 | 1 | 0 | 0 |
| 0 | 0 | 1 | 1 | 1 | 1 | 0 | 1 | 0 | 0 | 0 |
| 0 | 1 | 0 | 1 | 1 | 0 | 1 | 0 | 0 | 0 | 1 |
| 1 | 0 | 1 | 1 | 0 | 1 | 0 | 0 | 0 | 1 | 1 |
| 0 | 1 | 1 | 1 | 1 | 0 | 0 | 0 | 1 | 1 | 0 |
| 0 | 0 | 0 | 1 | 1 | 1 | 1 | 1 | 1 | 1 | 1 |

As is well known and is evident from inspection, each of the above code words differs from every other code word in at least three bits. Accordingly, each of the code words is highly distinctive and can be distinguished from other code words even if substantial noise is introduced.

In FIGURE 1, the sequence of code word signals is shown as being coupled to a radio transmitter 8 from which it is transmitted by phase modulation or other suitable modulation techniques to radio receiver 9. Although the invention is particularly well suited for such systems, it is to be understood that the correlation decoder invention is applicable to any digital data transmission system.

The decoder 10 is coupled to the receiver 9 which provides bipolar bit signals to permit comparison of the received signals with the code word vocabulary for correlation. The vocabulary code word signal sequences for the (7,4) code are generated by a shift register 11. Because of the cyclic nature of the (7,4) code, half the vocabulary is comprised of words having the same sequence of bits in the same order but they differ by having a relative shift in their starting point in the cyclic sequence. Considering the above table, for example, the first two code words are 1110010 and 1100101. With the first code word set in shift register 11, a cycle of the register will generate a bit sequence representing the first code word at the first stage of the register. Similarly, a bit sequence representing the second code word will be generated at the second stage of the shift register. As a result, a complete cycle of operation, in which the first code word in shift register 11 is recirculated, generates, in parallel, seven sequences of bit signals corresponding to the first seven code words at the respective stages of the register. These sequences of signals are each compared with the received code word to generate the correlation function. This function is provided by multiplier-integrator elements 13–28. Each of these elements such as 13 is conveniently a multiplier in series with an integrate-and-dump circuit. Since half of the code words of the vocabulary are simply the bit by bit complements of corresponding code words in the other half, the complement of the sequence of bit signals produced at the output of each stage of the shift register is also a code word. Accordingly, the multipler-integrators 21–27 are connected to the complemented outputs of respective stages of shift register 11. Two code words which have not been considered are all "1's" and "0." Since these only require a constant multiplication factor, switching is unnecessary. Therefore, the multiplier-integrator elements 20 and 28 for these code words are connected directly to the receiver 9. By this arrangement, the received signal sequence is correlated with the vocabulary over a code word period and the corresponding outputs are made available in parallel.

A greatest magnitude selector circuit 29 provides an output indicative of the vocabulary word having the best correlation with the received signal sequence over a code word period. The greatest magnitude circuitry per se can take any conventional form. For example, the circuit can be comprised of a set of transistors, each of which has its base coupled to the output of one of the multiplier-integrators and each having a common emitter resistor coupled to all the multiplier-integrators.

For greatest clarity, the details of synchronization and timing functions have been omitted from FIGURE 1, since these functions may be implemented in a manner which is obvious to those skilled in the art. Note that one word of the code, contained in the shift register has formed the basis for computing the correlation of all 16 vocabulary words with the received waveform. Also note that the step-by-step processing of the waveform as it is received eliminates the difficult serial-to-parallel translation problem faced by delay-line type correlators. The particular form of the invention shown in FIGURE 1 assumes symmetrical keying at the transmitter, such as either phase shift keying (PSK) or frequency shift keying (FSK). Digit and word synchronization are established by conventional means.

The operation of the correlator shown in FIGURE 1 is summarized in terms of the following functions:

(a) Digit-by-digit serial generation of the transmitter vocabulary (the reference waveforms) in real time with reception of the noise-perturbed transmitted waveform.

(b) Digit-by-digit simultaneous real-time multiplication of all reference waveforms with the received waveform, during its reception.

(c) Real-time integration of each resulting product over a one-word time duration.

(d) Selection of the integrator output having the largest absolute value, and indication of its polarity.

(e) Dumping the contents of all integrators (restoring to zero).

Functions (a), (b), and (c) occur in real time with reception of the noise perturbed waveform, and functions (d) and (e) occur in direct sequence thereafter. The decision-making type of semiconductor multiple-word correlator requires all five functions, but the signal-to-noise ratio enhancement type does not use (d).

The required timing relationships between the received word and the circulating (cyclicing) reference waveform illustrated in FIGURE 1 may be summarized as follows:

(a) While the correlator is processing the first bit interval of the received waveform, shift register 11 contains the first code word of the cord vocabulary listed in the (7,4) Code Vocabulary table presented hereinbefore, namely, 1110010, as shown in FIGURE 1.

(b) At the end of the first bit interval, shift register 11 is cyclically shifted one bit to the left, so that during the second bit interval, the shift register contains the second code word, namely, 1100101.

(c) In general, while the correlator is processing the *i*th bit interval of the received waveform, shift register 11 contains the *i*th code word.

(d) At the end of the 7th bit interval, the one-bit cyclic shift to the left restores the contents of shift register 11 to its initial state (in which it contains the first code word), thus preparing the correlator for processing the next received waveform.

A feature of considerable importance is the simplicity with which repeated transmissions of any given code word may be optimally processed. All that is required is the inhibition of the selection and dumping functions (d) and (e) until all transmissions of the given code word have been received, while functions (a), (b), and (c) are of course iterated once for each such reception.

Figures 2, 2A:
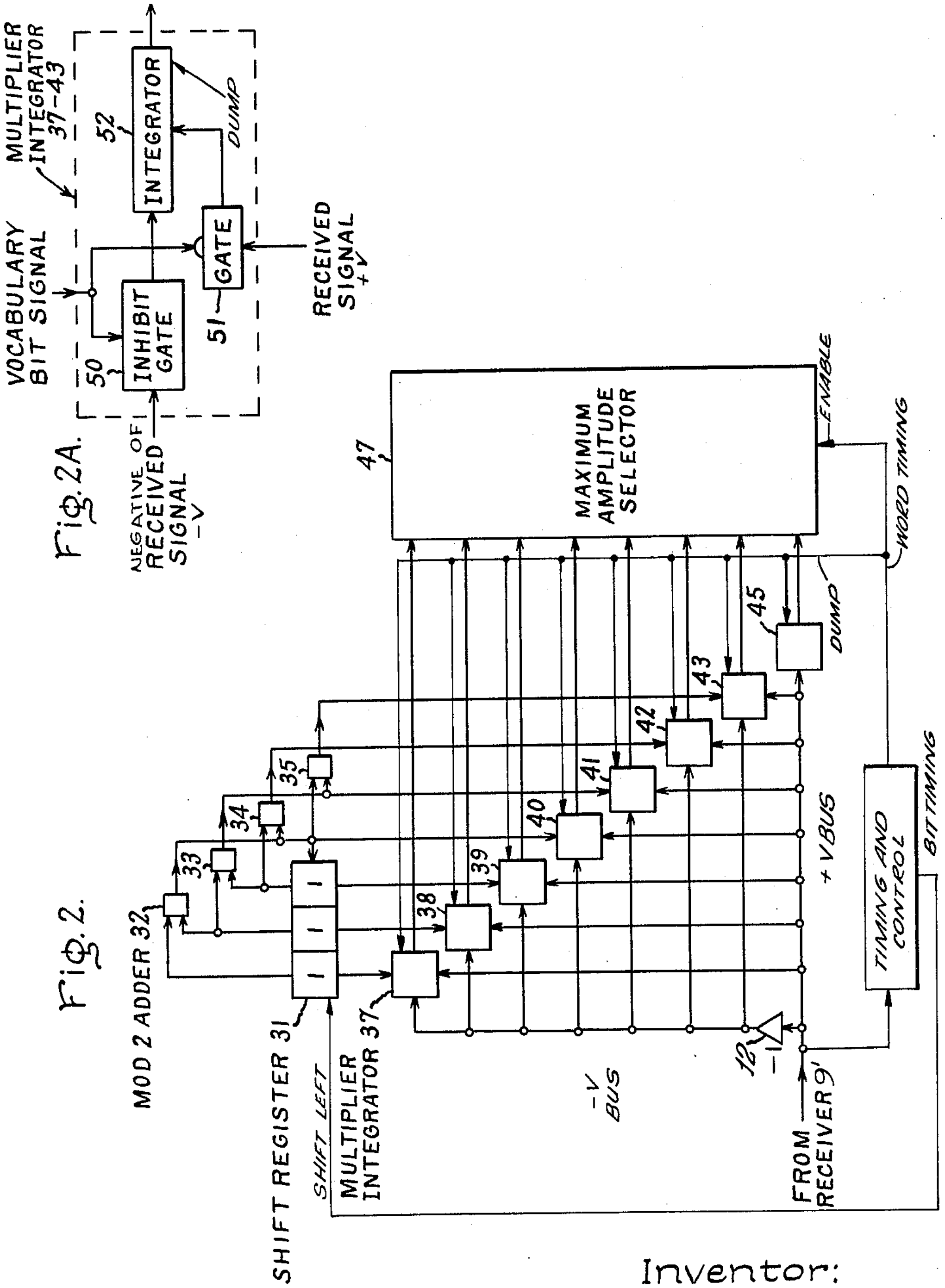
FIGURE 2 is a block diagram of a second embodiment of the invention for a (7,4) error correction code application with further simplification of the apparatus.
FIG. 2A illustrates the internal structure of the multiplier integrator circuits.

A preferred decoder is illustrated in FIGURE 2 which reduces the multiplier-integrator elements by a half and further simplifies the vocabulary source. In this arrangement, the output of the receiver 9′ (not shown) is applied to inverter 12 to make the bipolar received signal available for separate multiplication but common integration by providing a $-v$ bus in addition to the $+v$ bus. For the (7,4) code of this embodiment, seven multiplier-integrator circuits 37–43 are provided. These multiplier-integrators are each coupled to both the $+v$ and $-v$ received signal buses and to a single output of the vocabulary word source such as the first stage of shift register 31. The outputs of the multiplier-integrators 37–43 are applied to the maximum amplitude selector circuit 47 in the same manner as the multiplier-integrators of the FIGURE 1 decoder are applied to the greatest magnitude selector 29. For all "0's" or all "1's," an integrator 45 is provided which is coupled between the receiver 9 and the selector circuit 47 similarly to the multiplier-integrators 37–43 but without the multiplication function.

FIGURE 2A illustrates the internal structure of multiplier-integrator circuits 37–43. Each of these circuits is simply comprised of conventional analog gating switches 50 and 51 together with an electronic integrator 52. The received signal sequence is applied from the $-v$ bus to normally closed switch 50 and from the $+v$ bus to normally open switch 51. Because of the digital nature of the vocabulary word bits, being only "1" or "0," the switching functions correspond to multiplication operations. Accordingly, when a "1" or "0" vocabulary bit signal is applied to the multiplier-integrator circuit 37, the switches 50 and 51 perform a multiplication of the received signal sequence by $+1$ or $-1$, respectively.

Assume now that a code word is transmitted from the encoder to the decoder over a noisy communications channel. Then, since the complement of a code word is also a code word, the signal appearing at the output of the integrator 52 within the multiplier-integrator corresponding to the transmitted code word will be either the positive or the negative correlation function for that code word, and for tolerable noise levels, the remaining integrators will have outputs of lesser absolute magnitude.

The FIGURE 2 vocabulary word sequence source 31–35 performs the same function as the shift register 11 in FIGURE 1. However, simplification of actual hardware and reduction of space requirements is obtained because separate complement outputs are not required for the FIGURE 2 decoder. Accordingly, the shift register 31 has only three stages which together with four modulo 2 adders 32–34 generate one half of the cyclic portion of the vocabulary code words. The output of the three stages are connected to the modulo 2 adders so that as the shift register 31 is shifted to the left, the code word bit signals are made available at the outputs of each stage and of the adders, and the appropriate feedback signal is made available at the right-hand stage.

The most important characteristic of the invention as illustrated in the embodiments described above is the implementation of correlation operations with simple digital and analog components, and the further simplification of the correlation apparatus by utilization of the cyclic properties of well chosen vocabularies. Thus delay lines are dispensed with and correlation signal processing apparatus such as radar pulse compression circuitry results which has the important property of having a continuously variable data rate. Variation of the data rate merely requires adjustment of the clock frequency without any substitution of components. Accordingly, the circuitry is adjustable for accommodating changes in data frequencies such as caused by doppler frequency shifts.

Figure 3:
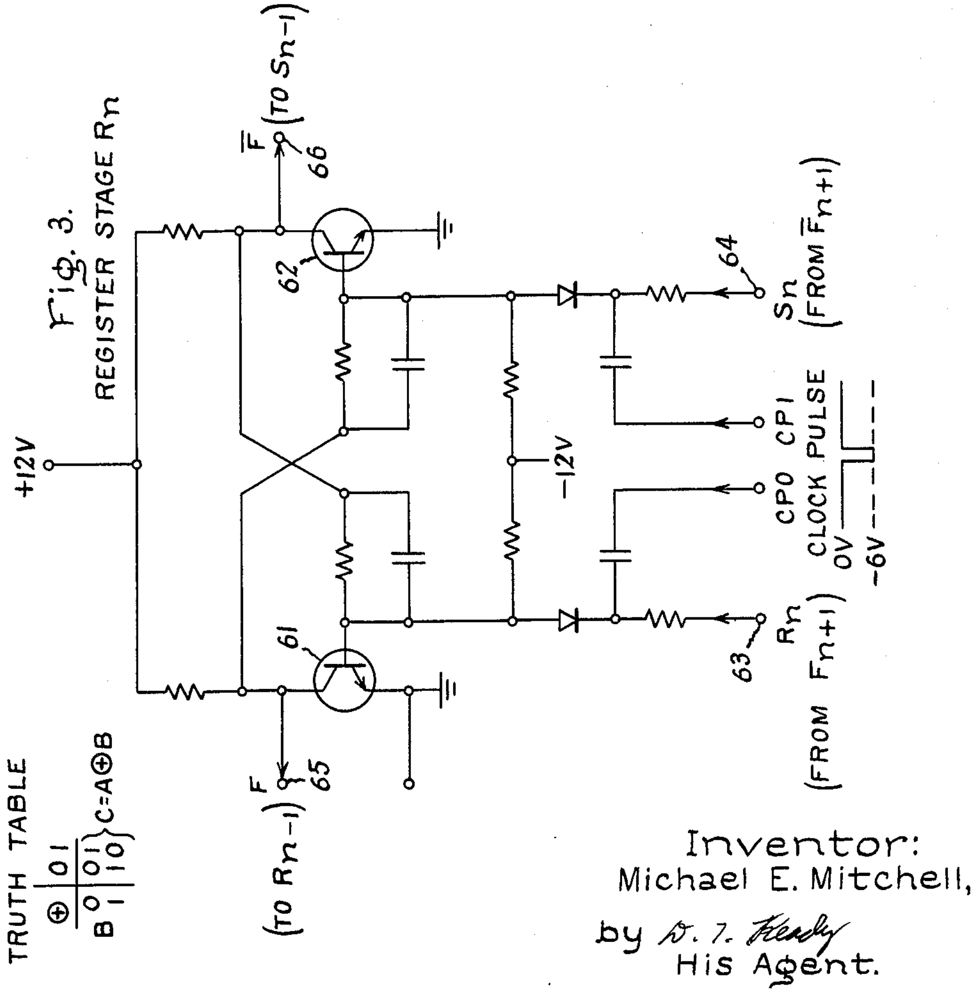
FIGURE 3 is a schematic diagram of one stage of a shift register suitable for use in the encoder or decoders of FIGURES 1 and 2.

The implementation of the FIGURE 1 and FIGURE 2 correlators may be carried out with conventional components. For example, the shift registers 24, 31 and 51 can be implemented by a series of standard flip-flops such as shown in FIGURE 3. Each flip-flop $R_n$, is a single stage in the shift register and is interconnected with the adjoining stages $R_{n+1}$ and $R_{n-1}$. In the preferred embodiment of the system, a "1" bit signal is in the form of a positive voltage and a "0" bit is in the form of a zero voltage level. Therefore, the n-p-n transistors 61 and 62 are interconnected so that when the flip-flop is "set," the right-hand transistor 62 is conducting and the left-hand transistor 61 is off. Accordingly, a positive voltage appears at the output terminal 65 as F and a zero voltage appears at the complementary output terminal 66 as $\overline{F}$. When the negative going clock pulse is applied to the base of each transistor, the conducting transistor is cut off. Upon removal of the clock pulse, the flip-flop circuit assumes a "set" or "reset" state in accordance with the last state of the preceding stage. That is, the output signals of stage $R_{n+1}$ are connected to input terminals 63 and 64 so that $S_n=F_{n+1}$ (before the shift) and $R_n=\overline{F}_{n+1}$.

Figure 4:
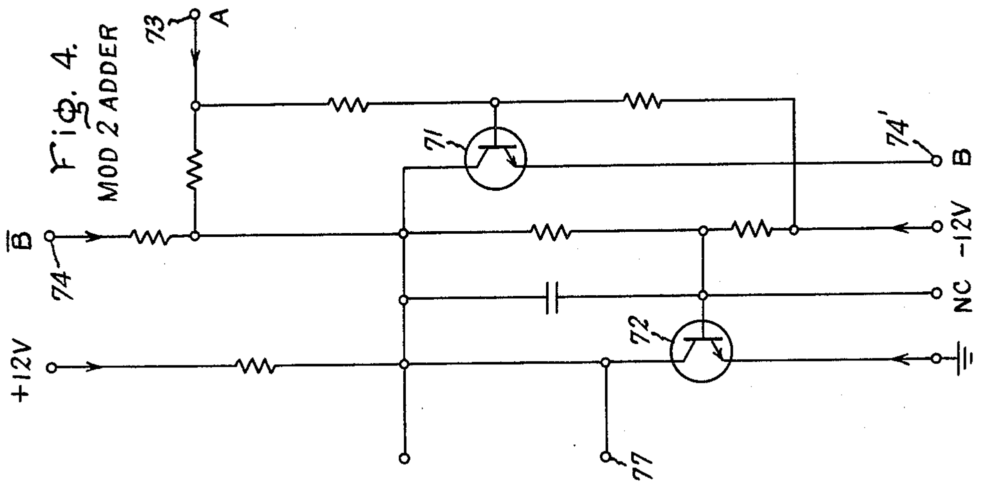
FIGURE 4 is a schematic diagram of a suitable two-input modulo 2 adder for the FIGURE 1 encoder and the FIGURE 2 decoder.

A suitable component for the mod 2 adder is shown in FIGURE 4. The n-p-n transistors 71 and 72 operate to produce a positive voltage at the output terminal 77 in accordance with an "exclusive or" logic function. If either input, A at input terminal 73 or B and $\overline{B}$ at input terminals 74 and 74′, is a "1" the output at terminal 77 is a positive voltage and if the inputs are both either "1's" or "0", the output signal is a zero voltage. This is because the transistor 72 is conducting only if $\overline{B}$ and A provide positive voltages or if B provides a positive voltage while A provides a zero voltage.

Frequently, a correlator serves the function of indicating which of several waveforms available to a transmitter is in best agreement with a received waveform. This is the decision-making type of correlator, which is mainly employed for improved communication performance. A second type of correlator merely computes the correlation of the received waveform with each waveform in the transmitter vocabularly without making a final decision. The function of the second type of correlator is to enhance the received signal-to-noise ratio, which is useful in both communication and signal detection applications. The invention described here includes both types. The primary function of either type of correlator is to increase the error tolerance and signal recovery capabilities of the system to which it is applied.

Three additional well-known classes of codes are also of practical importance. These are first, the maximal sequence codes, such as the (7,3) code, second, the bi-orthogonal codes, such as the (8,4) code, and third, the orthogonal code, such as the (8,3) code. Appropriate correlators for each of these codes consist of a straightforward variation of the illustrated correlators.

I claim:

1. Correlation apparatus comprising:
(a) a cyclic digital signal source providing a plurality of parallel output signals each consisting of a sequence of bit signals constituting a set of known sequences;
(b) data input means providing a sequence of bit signals comprising a received word to be compared with the known sequences;
(c) a plurality of multiplier-integrator circuits, each circuit being responsive to the received sequence of bit signals and to one of said known bit signal sequences to derive a correlation with respect to each of the known sequences by synchronously multiplying each of these sequences of signals by the received signal sequence and integrating the product; and
(d) control means to synchronize said signal sequences.

2. The apparatus of claim 1 wherein:
(e) said cyclic signal source includes a multi-stage shift register having feedback connections such as to cyclically generate in parallel the plurality of known sequences.

3. The apparatus of claim 1 wherein:
(e) said multiplier-integrator circuits include a pair of multiplier switching means to provide both a positive and negative product for integration so that the output is a correlation for a first known sequence or its complement.

4. The apparatus of claim 1 further comprising:
(e) a greatest magnitude circuit responsive to the integrated output signals of said multiplier-integrator circuits to provide an output indication of the known sequence having the greatest correlation with the received sequence of signals.

5. In a digital data processing system, apparatus for comparing code words of a vocabulary consisting of distinctive cyclic sequences of binary bit signals with a received coded data word consisting of a received sequence of signals comprising:
(a) a cyclic signal source including a shift register having feedback connections such as to cyclically generate in parallel a plurality of sequences of bit signals corresponding to vocabulary words;
(b) coded data input means providing a sequence of bit signals constituting a word to be compared with said vocabulary;
(c) a set of multiplier-integrator circuits, each circuit being responsive to one of the vocabulary word signal sequences to switch successive elements of the received coded data signal sequence into the integrator with either positive or negative polarity in accordance with the successive bit values of each vocabulary word;
(d) control means to synchronize the words consisting of said sequences; and
(e) a greatest magnitude detector circuit responsive to said multiplier circuit for providing an output indication of the vocabulary word having the greatest correlation with said received word.

References Cited by the Examiner

UNITED STATES PATENTS 3,036,775 5/1962 McDermid et al. -- 235—181 X

OTHER REFERENCES

Pages 1741–1744, October 1958, Green et al., an Error-Correcting Encoder and Decoder of High Efficiency, Proc. of the IRE.

R. C. BAILEY, *Primary Examiner.*

MALCOLM A. MORRISON, *Examiner.*

E. M. RONEY, M. LISS, *Assistant Examiners.*